(12) United States Patent
French et al.

(10) Patent No.: US 7,578,477 B2
(45) Date of Patent: Aug. 25, 2009

(54) INTERNAL SECURITY DOOR FOR AN AIRCRAFT

(75) Inventors: Clive French, Nottingham (GB); Smail Maksen, Grenade (FR)

(73) Assignees: Airbus, Blagnac (FR); Airbus Deutschland GmbH, Hamburg (DE)

( * ) Notice: Subject to any disclaimer, the term of this patent is extended or adjusted under 35 U.S.C. 154(b) by 183 days.

(21) Appl. No.: 11/195,744

(22) Filed: Aug. 3, 2005

(65) Prior Publication Data

US 2006/0169839 A1    Aug. 3, 2006

Related U.S. Application Data

(60) Provisional application No. 60/606,528, filed on Sep. 2, 2004.

(30) Foreign Application Priority Data

Aug. 3, 2004    (FR)    .................... 04 08578

(51) Int. Cl.
*B64C 1/14* (2006.01)

(52) U.S. Cl. ............. 244/129.5; 244/118.5; 244/117 R; 244/129.4; 49/62; 49/31; 49/280

(58) Field of Classification Search .............. 244/118.5, 244/117 R, 129.4, 129.5; 49/280, 31, 62
See application file for complete search history.

(56) References Cited

U.S. PATENT DOCUMENTS

| | | | |
|---|---|---|---|
| 4,597,549 A | | 7/1986 | Ryan |
| 4,899,960 A | * | 2/1990 | Hararat-Tehrani et al. ........................ 244/118.5 |
| 5,085,017 A | * | 2/1992 | Hararat-Tehrani ................. 52/1 |
| 5,573,053 A | * | 11/1996 | Hanemaayer ................ 160/206 |
| 5,833,293 A | * | 11/1998 | Ludwig ........................ 296/21 |
| 6,257,523 B1 | * | 7/2001 | Olliges ..................... 244/118.5 |
| 6,588,705 B1 | | 7/2003 | Frank |
| 6,698,690 B2 | * | 3/2004 | Novak et al. ................. 244/121 |
| 6,702,230 B2 | * | 3/2004 | Movsesian et al. ........ 244/118.5 |
| 6,817,577 B2 | * | 11/2004 | Semprini ................. 244/118.5 |
| 6,945,497 B2 | * | 9/2005 | Saku et al. ................ 244/129.5 |
| 6,976,658 B2 | * | 12/2005 | Sekikawa et al. ......... 244/118.5 |
| 2003/0160130 A1 | | 8/2003 | Novak et al. |
| 2003/0192989 A1 | | 10/2003 | Owen et al. |
| 2004/0094670 A1 | | 5/2004 | Pratt et al. |
| 2005/0247823 A1 | | 11/2005 | Wood et al. |
| 2006/0048449 A1 | | 3/2006 | Roques et al. |

FOREIGN PATENT DOCUMENTS

| | | |
|---|---|---|
| FR | 2848179 | 6/2004 |
| GB | 2381551 | 5/2003 |
| WO | 03/106796 | 12/2003 |

OTHER PUBLICATIONS

U.S. Appl. No. 11/189,882, filed Jul. 27, 2005, French, et al.

* cited by examiner

*Primary Examiner*—Michael R Mansen
*Assistant Examiner*—Philip J Bonzell
(74) *Attorney, Agent, or Firm*—Oblon, Spivak, McClelland, Maier & Neustadt, P.C.

(57) ABSTRACT

This door consists of:
  an internal structure (16) in which at least two compartments are executed;
  a panel (18) mounted in each of the compartments, and
  holding means of each panel (18) in the corresponding compartment. These means permit the release of the panel when a predetermined load, in a given direction, is applied to this panel.

23 Claims, 9 Drawing Sheets

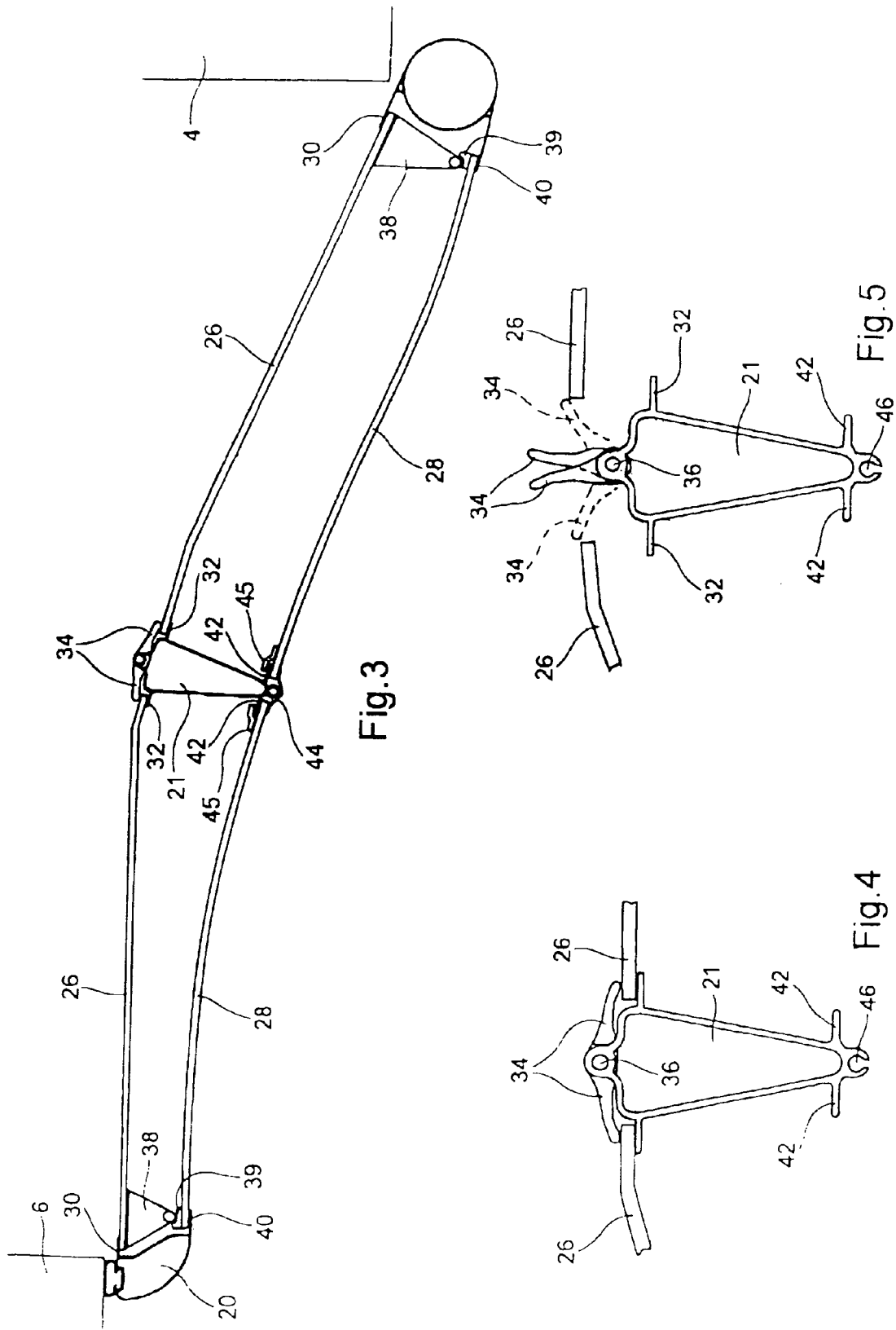

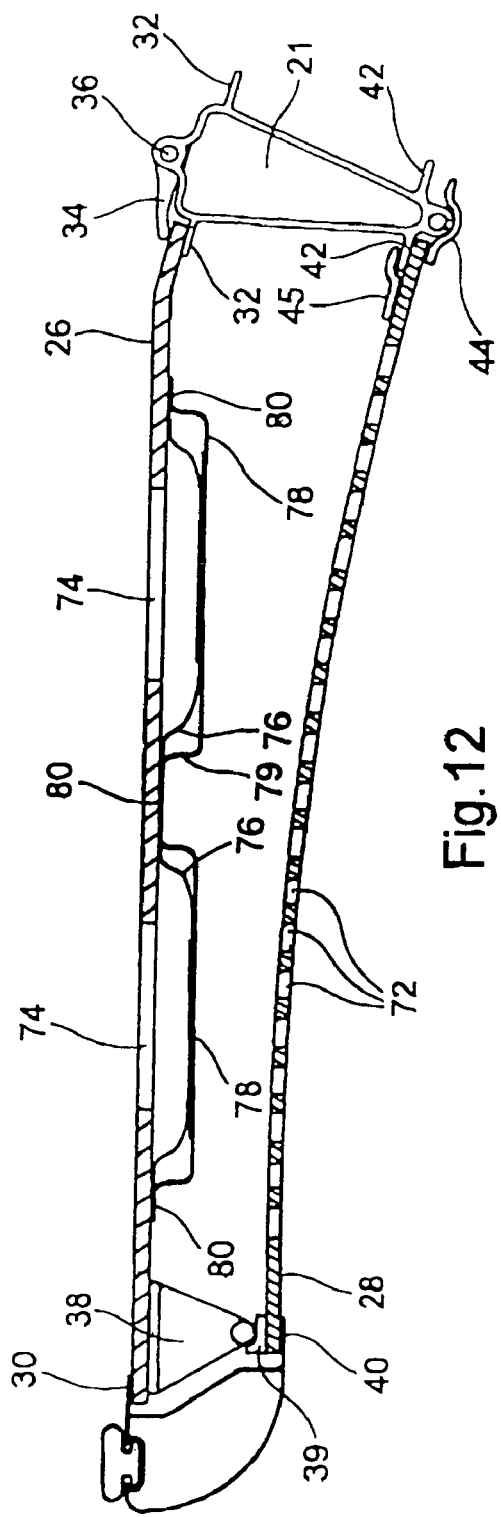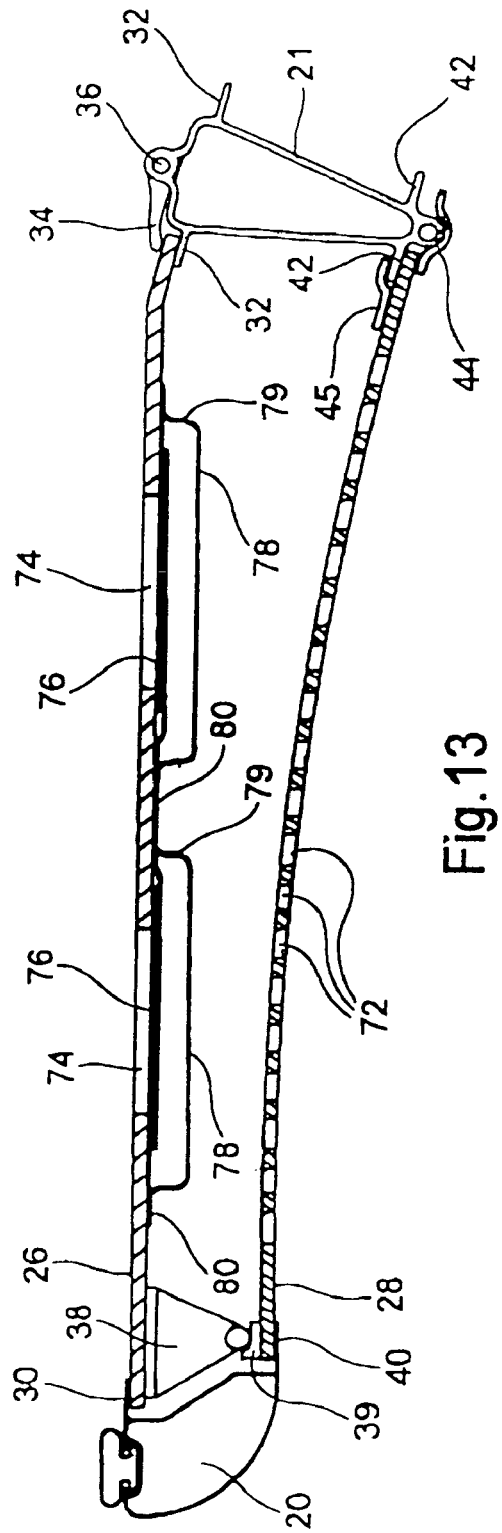

INTERNAL SECURITY DOOR FOR AN AIRCRAFT

This invention involves an interior security door in an aircraft.

Following the Sep. 11, 2001 attacks, measures have been taken to increase the security of aircraft cockpits. Among other, these measures have involved the door separating the cockpit of an aircraft from its cabin. According to new codes and standards, this door must form a barrier preventing any intrusion into the cockpit and entry into the cockpit must now be restricted to navigating personnel only.

As in the past, however, these cockpit doors must open automatically when a depression occurs, either on the cabin side or on the cockpit side.

The purpose of this invention is to increase security and safety on board of an airplane by making access to the cockpit more difficult to an intruder.

It has been noticed that in spite of the presence of security systems preventing the opening of a door, the latter is opened, for instance, to let the pilot or co-pilot pass through and an intruder can make use of such opening to access the cockpit because security devices are not operating at that time. As such, one of the weak points of the present cockpit door is that these are sometimes open during flight, such as on a long haul flight. At the basis of the invention is an original idea of preventing passengers to whom access to the cockpit is prohibited, from knowing when the cockpit door is open.

In certain aircraft, the cockpit door is located at the end of an aisle that serves as a space essentially used by navigating personnel and where toilets are usually located. Certain airline companies permit the use of these toilets by passengers.

The idea at the origin of this invention is to close off this aisle by a second door on the cabin side. The main purpose of this second door is to form a visual barrier preventing the passengers from seeing whether the door is open or closed.

Then, there is a technical problem. It may not be just a simple door. Indeed, in case of a depression inside the aircraft, this door may not prevent air flows inside the aircraft, and may not prevent the cockpit door from operating.

For this purpose, it proposes a security door for an aircraft that, according to the invention, includes:
- an internal structure with at least two compartments;
- a panel mounted in each of the compartments, and
- means for maintaining each panel in the corresponding compartment; these means permit releasing the panel when a given load, in a predetermined direction, is exerted against this panel.

This door structure has several advantages. First of all, when the door must "open" as a result of a depression, it does not pivot on its hinge pins or other pivoting system but the panels pop out of their compartments thus quickly releasing a passage for the air flow generated by the depression. Then, in an original manner, several compartments are provided. This has several advantages. If during the depression, one of the panels is not released, the flow of air can nevertheless pass through other openings released in their panels. As such, by multiplying the release mechanisms, one diminishes the risk in case of failure of one of them. Moreover, it is easier to make several small-sized panels than a single large-sized panel. Finally, in terms of security, this solution permits delaying an intrusion. Indeed, if an intruder succeeds in releasing all panels by force, he will still be held back by the grill-like structure of the door. With a single large-sized panel, once the panel is released by force, the intruder can freely pass through the opening thus made in the door.

The retention means can be released in various ways. As non-limiting examples, one can first of all provide that a differential pressure detection device on both sides of the door controls the release of the panels, for instance, electromagnetically. This detection can be an electronic or pneumatic detection. The electronic detection has the advantage of permitting a very quick release of the panels while the pneumatic detection is slower but on the other hand, it is more reliable and cheaper.

It is also possible to provide for breakable components to hold the panels. This solution is reliable, with a very favorable cost price but it has the inconvenience of being single usage. The preferred solution, as it is shown hereinafter, is the use of elastically pre-stressed means that can be reset to hold the panels in their compartments.

To prevent the released panels from becoming projectiles that might injure, or even kill a person, each panel is beneficially connected to an internal structure by a link.

In a preferred form of execution of a security door according to the invention, two opposite edges of each panel for instance rest each against an edge, with one of the edges of the panel being held on the applicable edge by elastically pre-stressed retaining means so as to release the applicable panel when a predetermined force is exerted against it. As already indicated above, this form of execution of the means of release of the panels has the advantage of being reliable; it is low in cost and it can be reset, in other words, it can be used several times.

Each panel has preferably two plates, with each plate corresponding to one face of the door. This solution has numerous advantages. First of all, this structure enables the door to have better insulation, especially sound insulation. Subsequently, it permits making the door being more secure with respect to an intruder's attack. Finally, the space between the two plates can also be used to house equipment (ventilation, etc.).

The two plates are beneficially attached one to the other by a link to maintain cohesion of the panel that they are forming.

A preferred form of execution of a door according to the invention, in which each panel has two plates, provides that the panel is mounted in a frame that has supporting edges for the first plate and supporting edges for the second plate, that the frame includes the means for holding one edge of the first plate on a first edge, with these means being elastically pre-stressed, that a spacer attached to the first plate is arranged in between the two plates near the edge opposite the elastically maintained edge and helps in keeping the two plates against the corresponding edges.

This last form of execution is beneficially because it permits releasing the first plate, then the second, when a depression appears on the side of the first plate. However, by pushing against the second plate, even in the direction of releasing the plates, the panel remains blocked in its compartment.

The internal structure of a door according to the invention includes for instance, two side posts as well as at least one vertical intermediate post located between the two side posts. For a door with this structure and in which the panels are tied to the internal structure by a link, with each link attaching a panel to the internal structure, attaches preferably the corresponding panel to an intermediate post of the internal structure. The released panels are then not held by side posts and as such risk less interference with monuments located near these posts.

For this same security door structure according to the invention, the side posts are for instance connected among each other by torsion boxes. Such a structure permits conferring a good mechanical resistance to the door.

To permit a good operation of the panel release means, the holding means of each panel that permit releasing the panel, are preferably arranged at an intermediate vertical post. As such, if an obstacle accidentally positions itself behind a side post of the door, the panels can nevertheless be released.

A security door according to the invention includes for instance at least six panels and preferably eight panels arranged in two columns of four panels.

To limit the weight of the door, the internal structure is beneficially executed in a light metallic alloy, and the panels are for instance made of a composite material that includes a honeycomb core.

This invention also involves an aircraft, characterized by the fact that it includes at least a security door as described above.

Details and advantages of this invention will appear even more from the description that follows, with reference to the attached schematic drawing, on which:

Illustration 1 is a view from above as a partial cross section of the front part of the aircraft;

Illustration 2 is a front view of a door according to the invention;

Illustration 3 is a view as a horizontal cross-section according to the sectional line III-III of illustration 2, at an enlarged scale;

Illustration 4 is a detailed view of the release mechanism shown on illustration 3 in the locked position;

Illustration 5 shows the mechanism of illustration 4 in the unlocked position;

Illustrations 6 to 8 are views corresponding to that of illustration 3 when a depression appears inside the aircraft cockpit;

Illustration 9 is an elevated view of the structure carrying the door of illustration 2.

Figure 1:
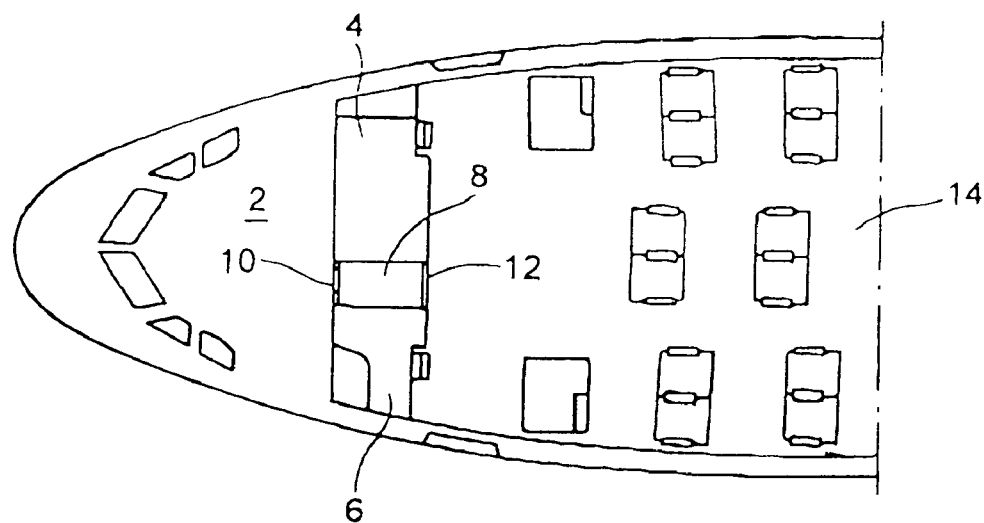
Figure 2:
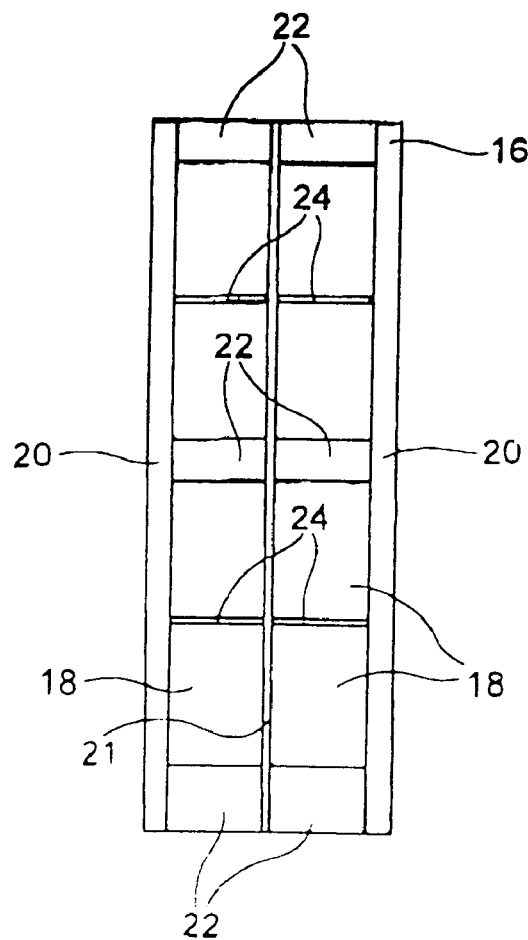
Figure 6:
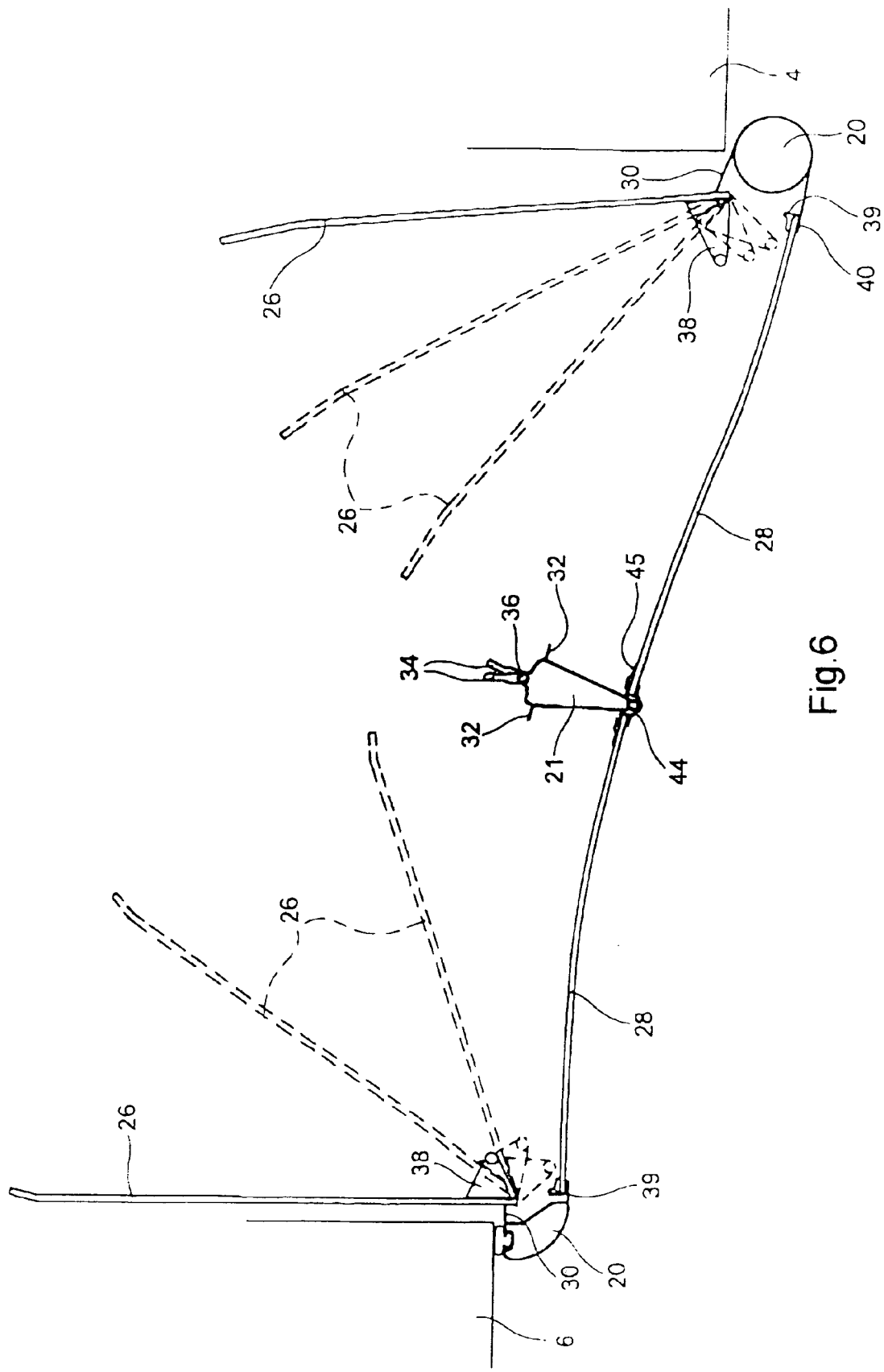
Figure 7:
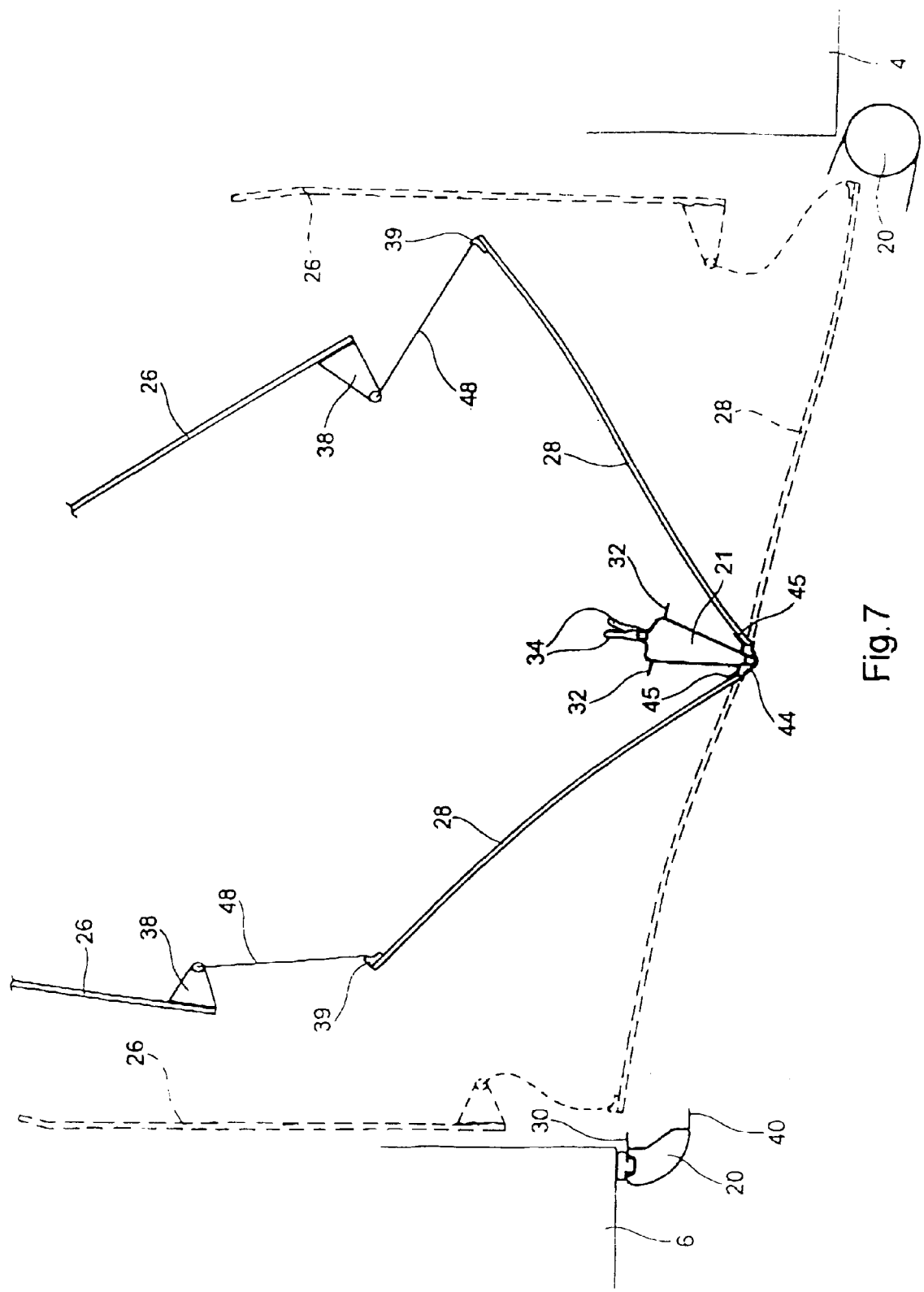
Figure 8:
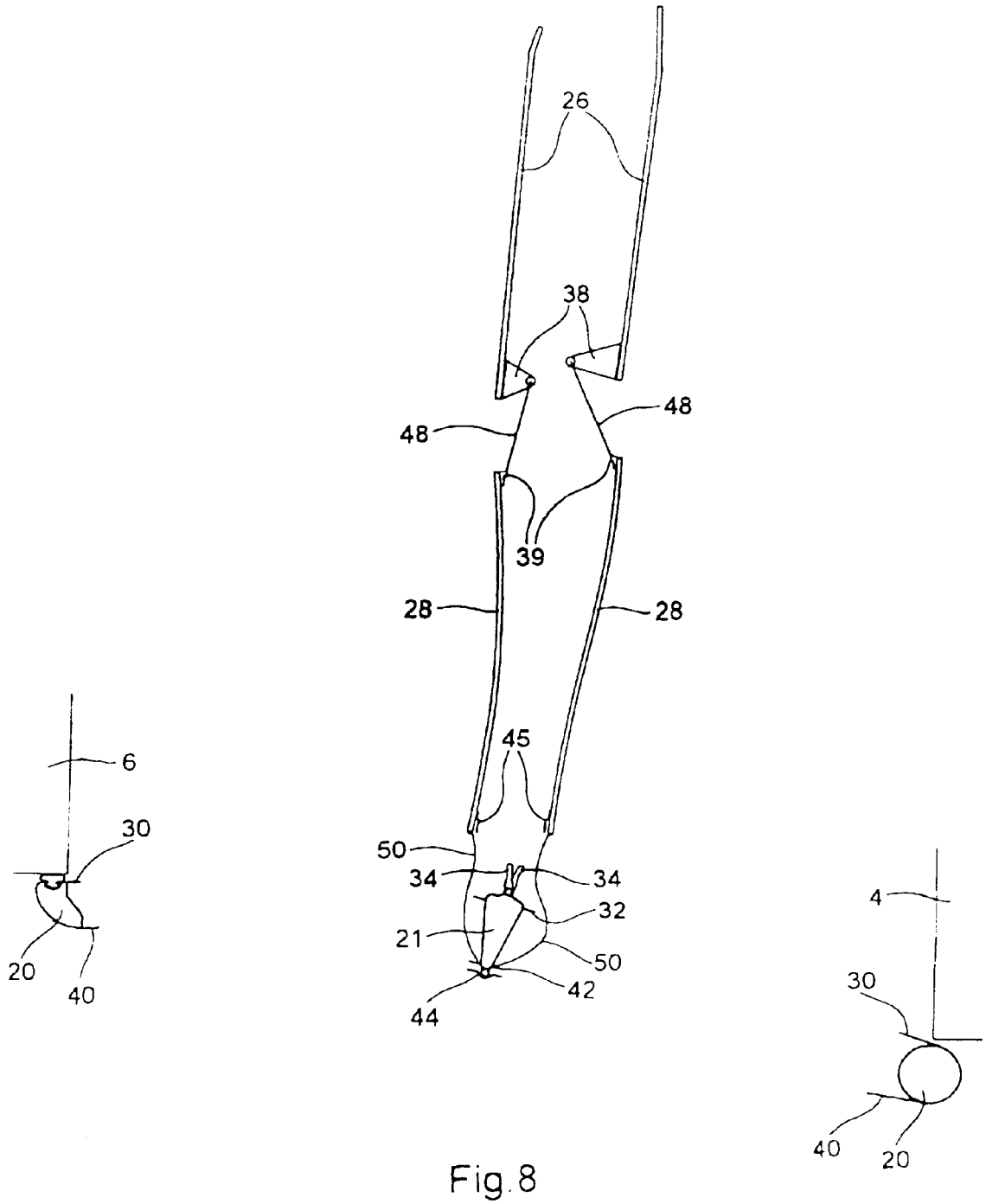
Figure 9:
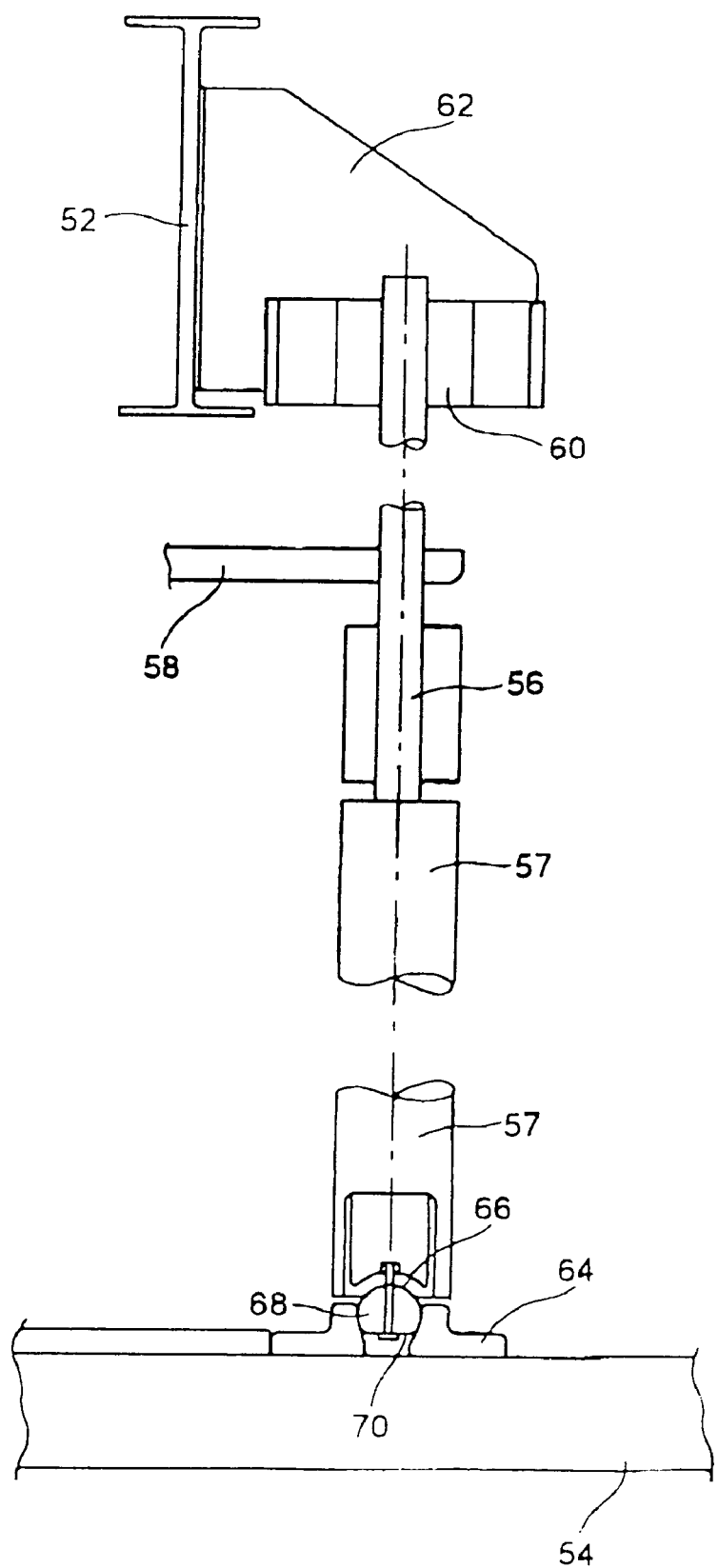
Figure 10:
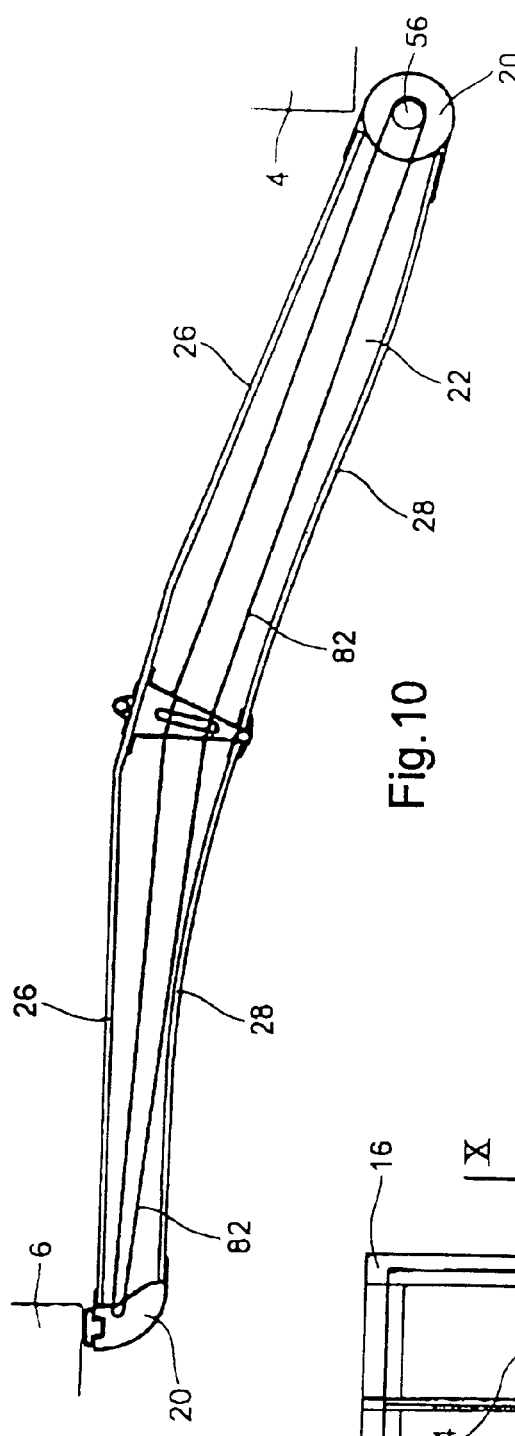
FIG. 10 is a sectional view according to the sectional line X-X of FIG. 11.
Figure 11:
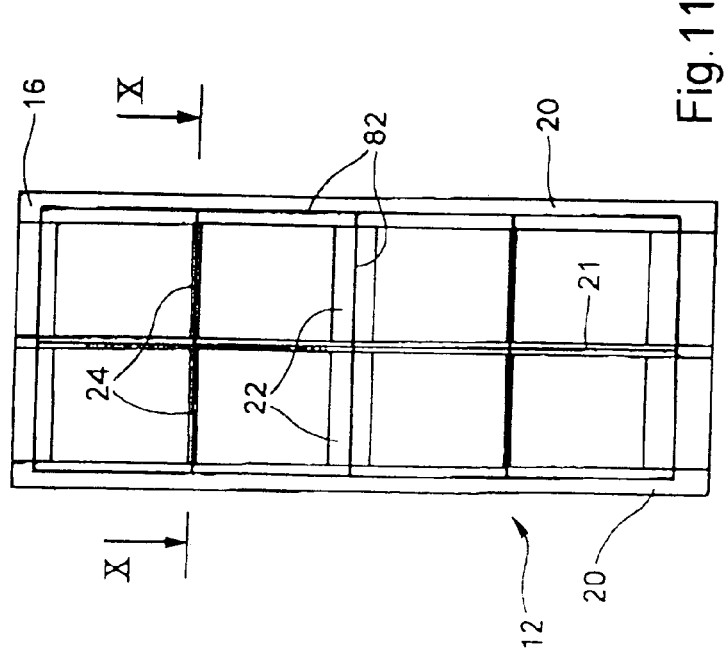
FIG. 11 is a front view corresponding to FIG. 2 showing a structural reinforcement for the door of illustration 2.
Figure 14:
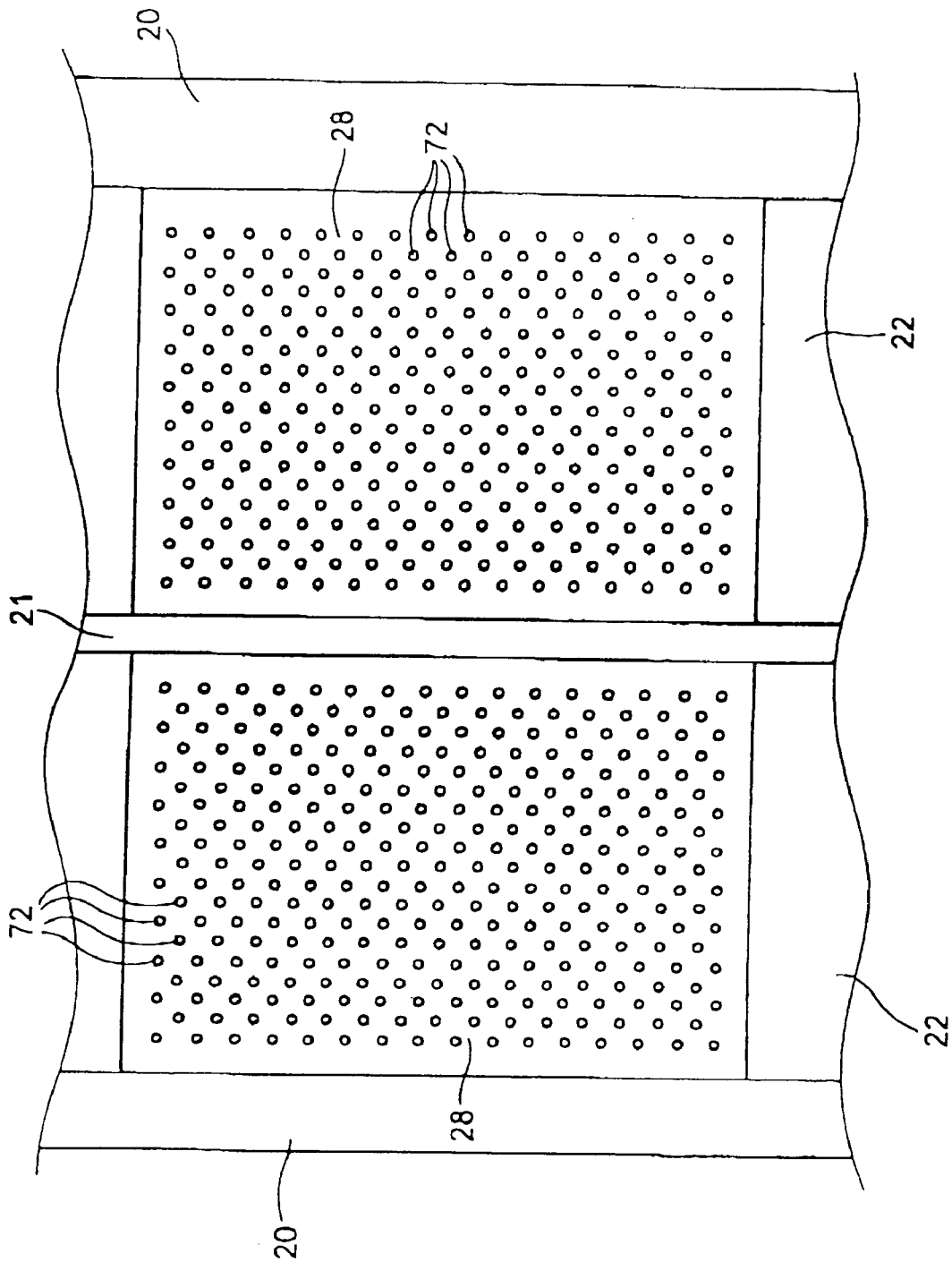

Illustrations 12 and 13 are enlarged scale views corresponding to the view of illustration 3, showing an improvement of a door panel according to the invention, and Illustration 14 shows a front view of a two-panel assembly such as those shown on illustrations 12 and 13.

On illustration 1, one recognizes a cockpit 2 of a long haul carrier. Immediately behind the cockpit, there is a space used in particular by the crew. This space includes on the one hand a rest area 4 comprising for instance sleeping cots or beds and on the other hand, bathrooms with toilets, a wash basin and a shower. An aisle 8 is provided between rest area 4 and bathrooms 6 to permit access to cockpit 2. In a classic design, a door 10 closes off the cockpit 2 and permits to access it.

Cockpit door 10 closes off aisle 8 at one of its ends. In an original design, it is proposed to provide a second door 12 at the other end of aisle 8.

The second door 12 has two main functions. A first function is to hide cockpit door 10 from the passengers' view. For this first function, this second door 12 can be placed in an intermediate position in aisle 8 or else at the end of this aisle 8 opposite cockpit door 10. Another function of this second door is to provide privacy to the area reserved for the crew. For this second function, second door 12 is preferably located at the end of aisle 8 opposite cockpit door 10, as shown on illustration 1.

For security reasons, cockpit door 10 is locked during flight and means (access code, badge, . . . ) are provided to attempt preventing access to the cockpit by any unauthorized individual. This cockpit door 10 is also bullet proof. However, in the event of a depression in cabin 14 of the aircraft, means permit the automatic opening of this door so as to balance the pressures between cabin 14 and cockpit 2 and thus prevent excessive stress on the aircraft structure.

Second door 12 must not disturb operation of cockpit door 10, such as when a depression occurs inside cockpit 2.

Illustration 2 shows a frontal view of a preferred form of construction to manufacture second door 12 represented by illustration 1. This door comprises an internal structure called frame 16 in the remainder of the description. Eight panels 18 are mounted in this frame 16.

Frame 16 comprises two lateral posts 20 and one central post 21 connected by three torsion boxes 22; one top box, one median box and one box at the bottom. Likewise, among the top and median boxes on the one hand and the median and bottom boxes on the other hand, the frame presents two openings. Each of these openings is also divided each time by means of a cross-strut 24 so that the frame is formed of eight compartments each receiving a panel 18. These eight compartments are distributed in two columns of four. Each compartment receives a panel 18 shown in greater detail on illustrations 3 and 4.

Hereinafter, to describe second door 12, one considers that it is in its closed position. One considers then that the front face of the door is the face turned towards cockpit 2 and the rear face of this door is the one turned to cabin 14, when second door 12 is in its closed position as shown on illustrations 1 and 3. The adjectives "inner" and "outer" refer to second door 12.

Each panel 18 comprises two plates: one front plate 26 and one rear plate 28.

Front plate 26 rests against the inner face of a first edge 30 connected to a lateral post 20 as well as against the outer face of a second edge 32 of central post 21. The first and second edges 30 extend for instance over the full height of the compartment receiving panel 18. The top and bottom edges of the front plate 26 are preferably free.

Front plate 26 is held onto the second edge 32 by means of pivoting latches 34. Each latch 34 is mounted on a pin 36. A spring, not shown, pre-stresses latch 34 against the top face of front plate 26 to maintain it against second edge 32. A similar pin 36 can be used to maintain latches 34 acting on the two front plates 26 of panels of two adjacent compartments.

On the side of side post 20, front plate 26 is held by a spacer 38 as shown hereinafter. Lateral post 20 shows a third edge 40 that is facing first edge 30. Rear panel 28 is supported against the inner face of this third edge 40. Spacer 38 wedges front plate 26 and rear plate 28 against respectively the first and third edges 30, 40. A wedge 39 is located between rear plate 28 and spacer 38. The form of this wedge 39 is adjusted on one side to the form—considerably flat—of rear plate 28 and on the other side to the form of spacer 38.

The distance separating the two edges 38 and 40 thus corresponds to the thickness of front plate 26 added to the thickness of rear plate 28 and to the height of the assembly formed by spacer 38 and wedge 39. Spacer 38 shows for instance the form of a U iron of which the base is secured to the inner face of front plate 26. The branches of this U iron are resting against wedge 39 that is connected to rear plate 38.

It is described above how the vertical edge of rear plate 28 is maintained along lateral post 20. On the side of central post 21, the edge of rear plate 28 is resting against a fourth edge 42 on its outer face. This edge of rear plate 28 is maintained against fourth edge 42 using a small bar 44 that clicks into the central post 21. On illustrations 4 and 5, one observes a housing 46 used for engaging small bar 44 (visible on illustration 3). Also, on illustrations 3 and 6 to 8, one observes that rear plates 28 are provided with fingers 45 permitting maintaining these plates against edge 42.

Illustrations 5 to 8 show the behavior of panels 18 when a depression occurs in the front of the airplane, for instance, in cockpit 2, in other words, on the side of the front face of second door 12.

In such case, when second door 12 is closed, it is sucked towards the inside of aisle 8. Frame 16 of second door 12 is rigid and is scheduled to withstand such a depression. Second door 12 is designed in such a way that panels 18 give away and are sucked inside aisle 8.

In a first instance, the front plate 26 of each panel 18 is sucked inside aisle 8. First edge 30 is stationary. On the other hand, latches 34 pivot. When the force exercised on a latch 34 is sufficient (each latch 34 is pre-stressed by a spring), latch 34 pivots and releases front plate 26 of panel 18. Then, this plate pivots around first edge 30 and pulls spacer 38 with it. This then "rolls" onto wedge 39 for which the form is adjusted to facilitate the disengagement of spacer 38. The edge of rear plate 28 that was resting against third edge 40 is then released and rear plate 28 starts to pivot with respect to fourth edge 42 (illustration 7). Fingers 45 permit controlling this pivoting movement by maintaining the edge of rear plate 28 supported against fourth edge 42. A link 48 which, for instance, may be a cable, a harness, a strip or similar, links front plate 26 to rear plate 28. This link 48 is for instance secured to spacer 38 on one side and on wedge 39 on the other side.

Illustration 8 shows two panels 18 that are fully open. One observes on this illustration a second link 50 (for instance similar to link 48) that links rear plate 28 of each panel 18 to central post 21. Plates 26 and 28 are thus retained and do not become projectiles that could hit (and possibly kill) a member of the crew.

The eight panels 18 open simultaneously. Indeed, they are exposed to the same depression and as such react in the same way. When the panels are fully open (illustration 8), only frame 16 of second door 12 is opposed to the back-to-front air flow associated with the depression caused at the level of cockpit 2. This frame 16 offers little resistance to the flow and the corresponding load loss is negligible (as are the stresses exerted on the aircraft structure). Second door 12 described above thus permits not disturbing the operation of cockpit door 10 in case of depression in the front of the plane, inside cockpit 2.

One observes from the description above and corresponding illustrations 3 to 8 that the system proposed for releasing panels 18 is a system that can be reset. Indeed, once the panels are removed from their compartments, they can be put back in place without a problem. It suffices to put first of all rear plate 28 back in place in its compartment, in position against edges 42 and 40, then, to put front plate 26 back against edges 30 and 32 before making latches 34 pivot, thus resetting the corresponding springs (not shown).

The force of the springs acting on the pivoting latches 34 is determined on the basis of the admissible load on second door 12. It can be estimated that the maximum depression at second door 12 is around 150 hPa. When such depression exists, the panels have already been released. The force that is exerted then onto second door 12 corresponds to the surface of the frame multiplied by the pressure exerted. To limit the forces exerted against second door 12, one can assume that this force is the maximum admissible force. If $P_{deci}$ is the value of the depression corresponding to the release of panels 18, one provides that the $P_{deci}$ multiplied by this total surface area of second door 12 is less than the maximum force exerted on the door and calculated previously. The springs acting on pivoting latches 34 are then set on the basis of the $P_{deci}$ value selected, of the surface area of corresponding panel 18 as well as of the number of pivoting latches 34 per panel.

One observes in the above description that the panels are released on the side of central post 21 and that once released, these panels, by virtue of the proposed structure, are considerably in the middle of aisle 8. This permits first of all regrouping of the panels and preventing that there are any on the two sides of the aisle. The main reason for this regrouping of panels towards the center of aisle 8 is however different. When a depression occurs inside cockpit 2, it spreads towards aisle 8. By reason of the depression, the modules, also called monuments, located on either side of aisle 8 have the tendency of moving towards each other, thus reducing the width of aisle 8. These monuments can then be deformed to the point that they cover the vertical edges of second door 12. Then, if panels 18 would release at lateral posts 20, this release could be hampered, or even prevented, by the monuments. Second door 12 would then form a barrier that would prevent balancing the pressures inside the plane. As we have seen above, this must be avoided. According to the position of the monuments found in aisle 8 with respect to the second door, one must possibly avoid positioning the latches (or other means of release) on the vertical lateral posts and place them rather towards the center of the door.

In case of depression at the level of cabin 14 of the plane, one can for instance provide for the opening of second door 12. This opening would cause loads due to the centrifugal force exerted by the movement of the door on the upper and lower securing points of the door on the plane.

As indicated above, the structure of panels 18 described permits through the successive release of the front plates and then the rear plates, the air to pass through as soon as a depression appears in cockpit 2. However, the structure described is such that when one pushes against panels 18 from cabin 14 towards the cockpit, in other words from the back to the front, the panels resist and do not separate from frame 16.

Indeed, when looking at illustration 3, one observes that each rear plate 28 is retained by stationary elements as long as the corresponding front plate 26 is in place. One observes on the illustration that on the one hand, each rear plate 28 is resting against a stationary fourth edge 42 and on the other hand is resting through a wedge 39 and a spacer 38 against a stationary first edge 30. As such, if an effort is exerted from the back to the front on rear plate 28, this effort is fully assimilated by edges 42 and 30. The effort exerted does not act on the pivoting latches that my release applicable panel 18.

As an example, illustration 9 shows a possible installation of the door on the plane structure. One observes on this illustration an upper beam 52 and a lower beam 54. One also observes a pin around which pivots the door as well as ceiling 58 of cabin 14 and aisle 8. This pin is made of two parts: a lower tube 56 inside which a circular cylindrical arm 57 can slide telescopically. A locking system, for instance a bayonet type system is foreseen to lock the pieces, such as by translation, one with respect to the other.

Arm 57 forms the top part of pin 56 of second door 12. It is mounted while pivoting in a stationary bearing 60 by a corner iron 62 on upper beam 52.

The bottom part of the door pin, consisting of tube 56, is mounted on a self-aligning bearing. This bearing also includes a stationary support 64 on bottom beam 54. This support 54 includes a housing with a spherical seat 66. A ball 68 for which the diameter corresponds that that of spherical seat 66, possibly showing a flat spot 70, is secured for instance through screwing, to the bottom end of tube 56. In a preferred form of construction, the latter has a spherical seat for receiving ball 68. This ball 68, when being placed in spherical seat 66 of support 64 permits the automatic alignment of the door pin during the installation of support 64 onto the aircraft floor, in other words, on bottom beam 54.

The telescopic pin of second door 12 permits a very easy assembly and disassembly of this door. For the assembly, arm 57 is slid inside tube 56. Once tube 56 is in place on ball 68, the door pin is turned to be located considerably facing bearing 60. Arm 57 is then taken out and locked in the "out" position. Disassembly is done easily by conducting installation operations in the opposite sequence.

Illustrations 12 to 14 show how air can circulate from the front to the back of the plane through second door 12. These illustrations show in greater detail the structure of front plates 26 and rear plates 28 of panels 18.

To enable the flow of air, rear plate 28 is shown, in the preferred form of execution shown on the drawing, in the form of a grill such as is shown by illustration 14. Holes 72 are regularly distributed over the full surface area (except maybe near the edges) of rear plate 28.

Front plate 26 is equipped with low pressure check valves. As such, one can provide for two valves per panel 18 as is suggested on illustrations 12 and 13. At each valve, a cutout 74 is made in front plate 26. Each cutout 74 is fully covered with an elastic membrane 76 that is impervious to air. A cover 78 with an outer skirt 79 and an edge 80 comes and covers elastic membrane 76. This cover 78 is secured to the inside face of front plate 26 at its edge 80. The external contour of elastic membrane 76 is partially sandwiched between this edge 80 and inner plate 26. If elastic membrane 76 and cover 78 for instance are rectangular, one can provide for instance that the two opposite edges of elastic membrane 76 are retained by edge 80 of cover 76 while the other two edges of elastic membrane 78 are free. Cover 78 extends in parallel to inner plate 26, at a distance thereof. Openings are provided in this cover, for instance at outer skirt 79 to permit the air to pass through.

Illustration 13 shows the check valves in their closed position. When an air flow arrives from the outside, in other words, an air flow that is moving from the back to the front of the plane, it pushes elastic membrane 76 against front plate 26 thus obstructing the corresponding cutout 74. On the other hand, as is shown in illustration 12, when the air flow comes from the inside, in other words, an air flow circulating from the front (aisle 8) to the back (cabin 14) of the plane, elastic membrane 76 is lifted from the inner face of front plate 26 and is pushed towards cover 78. As such, air can pass through cutout 74, the free edges of elastic membrane 76, the openings made in cover 78 and then through holes 72 of rear plate 28.

These check valves are used among other to permit ventilation to the area reserved for the crew and served by aisle 8. They are also used during the closing of second door 12 to prevent over-pressurizing the aisle which would hamper considerably the closing of this second door 12. These valves can also be used in the event of a depression inside cabin 14. Then, air can pass from aisle 8 to cabin 14.

It has been calculated that pressure variations at second door 12 during a depression in cabin 14 were considerably less than at cockpit door 10. Moreover, this difference in pressure diminishes rapidly, so that second door 12 can remain closed in case of depression inside cabin 14 without hampering the operation of cockpit door 10.

For instance, elastic membrane 76 is made of polyurethane. To collect the electrical charges from the static power sources during their passing through the check valves, one can provide to serigraph a network or system, in copper for instance, on each of elastic membranes 76 on the side of window 74. This network or system is then for instance connected electrically to link 48 that itself is electrically connected through rear plate 28 and link 50 to metal frame 16 of second door 12.

In a preferred form of execution, it is also provided to filter the air passing through the check valves. A foam filter can then for instance be placed over cover 78 of each valve. It is also possible to provide a filter on the inner face (rather than on the outer face) of rear plate 28, a filter that then covers holes 72 of this plate.

Illustrations 10 and 11 represent a complementary system that permits reinforcing second door 12. This system consists of a reinforcement 82 that reinforces the structure of frame 16. This reinforcement 82 links the main constituents of the frame to tie them even more one to the other. This reinforcement 82 is constituted for instance of harnesses glued on the components of the frame to link them. These harnesses are preferably made of carbon fibers. They are located on frame 16 so as to form a system or network comparable to webbing. As such, links are provided among the various harnesses. The latter are shown in the form of strips located along posts 20, 21, torsion boxes 22 and cross-struts 24 so as not to hamper the ejection of panels 18 in case of depression inside the cockpit.

Reinforcement 82 is preferably made of carbon fibers. Here, this material has several advantages. First of all, its mechanical strength permits reinforcing the structure of frame 16 of second door 12. Then, harnesses made of this material are relatively light and as such do not weigh down the structure of second door 12. Carbon fiber harnesses are also very difficult to cut. As such, in case of an attack, if a person attempts to push in second door 12 with force, reinforcement 82 then forms a very cumbersome webbing for the assailant. Presence of this webbing increases the time necessary for this assailant to go through second door 12. This additional time can be precious for the crew members, who in case of attack, can then take refuge inside cockpit 2 that is secured.

Second door 12 described above in this mode of preferred execution permits creating a private space for crew members and prevents passengers from seeing the cockpit door. This second door 12 also isolates the private space for navigating personnel thanks to its double barrier structure. The free space between the two plates of each panel permits achieving good sound insulation.

Second door 12 also forms a barrier to delay access to the cockpit to a terrorist who wants to take control of the plane. This second door does not hamper operation of the cockpit door in case of depression inside the plane cabin or inside its cockpit.

This second door 12, as shown above, can be made of a light structure—light alloy door frame, compound panels—and as such presents an acceptable higher load in an aircraft.

Needless to say, such a door is equipped with means that permit keeping it in its closed position as well as in the open position. This door is also beneficially equipped with means to bring it back to its closed position. As such, as soon as the door is in an intermediate position between its open and closed position, it closes automatically. Such means are known to the technical man in the field and are not described here. For greater security, it is also possible to provide an access code to be able to open this door. Other means of acknowledgement (badge, etc.) can also be provided. Such a door can also be equipped with surveillance means enabling members of the crew on one side of the closed door to check the cabin.

When the second door is equipped with air flow valves, one has seen that rear plates 28 of the panels 18 were perforated.

These perforations can be used for door esthetics. Indeed, rear plates 28 are located on the side of the aircraft cabin and are seen by the passengers. For instance, lighting can be provided between the two plates forming each panel to back-light the perforations of the rear plate. These perforations can then be arranged according to a particular pattern (drawing, airline logo, lettering, etc.).

As it appears from all of the above, the door described above can meet numerous criteria:

in case of depression inside the cockpit, it permits equalizing pressures;
in case of depression inside the cabin, it also permits pressures to be equalized;
this door is designed to stay together in case of very high mechanical stresses;
the weight of this door is relatively light;
this door can be equipped with classic closing/locking devices;
surveillance systems (spy hole, camera, etc.) can be provided;
this door can close automatically;
this door can lock automatically;
this door provides navigating personnel with a private space separate from the rest of the cabin;
it is possible to create an esthetic door that fits well with the rest of the cabin.

This invention is not limited to the preferred form of execution described above provided as a non-limiting example. It also covers all variations of execution available to the technical expert within the framework of the following claims.

The invention claimed is:

1. A security door for an aircraft comprising:
   an internal structure in which at least two compartments are located;
   a panel mounted in each of the compartments, each panel having at least two opposite edges, and
   elastically pre-stressed holding means for each panel in the corresponding compartment, wherein said elastically pre-stressed holding means release said panel in response to a predetermined load applied to said panel, in a given direction,
   wherein each panel includes two plates, a front plate mounted on a front side of the door facing a front of the aircraft and a rear plate mounted parallel to said front plate and on a rear side of the door facing a rear of the aircraft, said front and rear plates being independently mounted on the internal structure so as to be separately releasable by said elastically pre-stressed holding means and such that said front and rear plates move relative to each other upon being released,
   wherein, after the predetermined load is applied onto said front plate in the given direction, said elastically pre-stressed holding means release said front plate before said rear plate is released.

2. A security door according to claim 1, wherein each panel is attached to the internal structure by a link.

3. A security door according to claim 1, wherein the front and rear plates are attached to each other by a link.

4. A security door according to claim 1, further comprising a spacer located between the front and rear plates and configured to maintain the front and rear plates against corresponding edges.

5. A security door according to claim 2, wherein the internal structure of the door includes two lateral posts as well as at least one vertical intermediate post located between the two lateral posts and wherein each link connecting a panel to said internal structure connects the corresponding panel to an intermediate post of the internal structure.

6. A security door according to claim 5, wherein the two lateral posts are connected between each other by torsion boxes.

7. A security door according to claim 5, wherein the elastically pre-stressed holding means of each panel are located at the vertical intermediate post.

8. A security door according to claim 1, comprising at least eight panels arranged in two columns of four panels.

9. A security door according to claim 1, wherein the internal structure is made of a light metal alloy and wherein the panels are made of a composite material comprising a honeycomb core.

10. An aircraft comprising at least one security door according to claim 1.

11. A security door according to claim 1, wherein said holding means comprise pivoting latches mounted on a pin such that said pivoting latches pivot around said pin in order to release said panel.

12. A security door according to claim 11, wherein said internal structure comprises two lateral posts and one central post, said pin for said pivoting latches being located on said central post and not on said lateral posts.

13. A security door according to claim 2, wherein said holding means comprise pivoting latches that pivot in order to release said panel, and wherein said link is configured to link said panel to said internal structure after said pivoting latches have released said panel.

14. A security door according to claim 2, wherein after said holding means have released said panel, none of the panel's sides rests against said internal structure, and said panel is attached to said internal structure by said link.

15. A security door for an aircraft comprising:
   an internal structure in which at least two compartments are located;
   a panel mounted in each of the compartments, and
   a holding mechanism configured to hold each panel in a corresponding compartment in the absence of a decompression in said aircraft and configured to release said each panel in response to a predetermined load being applied to said panel in the presence of the decompression in said aircraft,
   wherein each panel includes two plates, a front plate mounted on a front side of the door facing a front of the aircraft and a rear plate mounted parallel to said front plate and on a rear side of the door facing a rear of the aircraft, said front and rear plates being mounted on the internal structure so as to be releasable by said holding mechanism,
   wherein said internal structure includes an intermediate post,
   wherein said holding mechanism includes a front latch connected to a front side of said intermediate post and that holds said front panel to the internal structure in the absence of a decompression in said aircraft,
   wherein said holding mechanism includes a rear holding mechanism connected to a rear side of said intermediate post and that holds said rear panel on the internal structure in the absence of a decompression in said aircraft, and
   wherein, in the presence of the decompression in said aircraft, said front latch mechanism releases said front plate before said rear plate is released.

16. A security door according to claim 15, wherein each panel is attached to the internal structure by a flexible link configured to link each plate of said panel to said internal structure after said latch mechanism releases said panel, wherein said flexible link is selected from the group consisting of a cable, a harness, and a strip.

17. A security door according to claim 16, wherein said internal structure comprises two lateral posts, said intermediate post being between said two lateral posts, wherein said flexible link is configured to link each plate of said panel to said intermediate post after said holding mechanism releases said panel.

18. An aircraft according to claim 10, comprising:
a cockpit closed by a cockpit door;
a cabin; and
an aisle between said cockpit and said cabin;
wherein said security door is located between said cockpit door and said cabin.

19. An aircraft according to claim 18, wherein said security door is located at an end of said aisle opposite said cockpit door.

20. An aircraft according to claim 18, wherein, after the predetermined load is applied onto said panel in the given direction, said elastically pre-stressed holding means release a first edge of said front plate such that said front plate pivots around a second edge of said front plate before said rear plate is released.

21. A security door according to claim 1, wherein, after said front plate pivots around the second edge of said front plate, the internal structure is configured such that a first edge of said rear plate moves toward the front of the aircraft so that the rear plate pivots around a second edge of the rear plate before said second edge of said rear plate is released.

22. A security door according to claim 15, wherein said rear holding mechanism includes an edge configured to be received between an edge of the rear plate and fingers of the rear plate.

23. A security door according to claim 1, wherein the two opposite edges of each panel are each resting against said internal structure, with one of the two opposite edges of the panel being held on said internal structure by said elastically pre-stressed holding means that release a corresponding panel in response to said predetermined load applied onto said corresponding panel.

* * * * *